(12) United States Patent
Kim

(10) Patent No.: US 11,944,961 B2
(45) Date of Patent: Apr. 2, 2024

(54) METHOD FOR REGENERATING WASTE ORGANIC ZINC CATALYST THROUGH SURFACE MODIFICATION

(71) Applicant: LG CHEM, LTD., Seoul (KR)

(72) Inventor: Sung Kyoung Kim, Daejeon (KR)

(73) Assignee: LG Chem, Ltd., Seoul (KR)

( * ) Notice: Subject to any disclaimer, the term of this patent is extended or adjusted under 35 U.S.C. 154(b) by 0 days.

(21) Appl. No.: 17/296,419

(22) PCT Filed: Dec. 20, 2019

(86) PCT No.: PCT/KR2019/018250
§ 371 (c)(1),
(2) Date: May 24, 2021

(87) PCT Pub. No.: WO2020/130735
PCT Pub. Date: Jun. 25, 2020

(65) Prior Publication Data
US 2022/0023850 A1    Jan. 27, 2022

(30) Foreign Application Priority Data
Dec. 21, 2018    (KR) .................. 10-2018-0167325

(51) Int. Cl.
*C08G 63/00* (2006.01)
*B01J 31/22* (2006.01)
*B01J 31/40* (2006.01)
*B01J 38/52* (2006.01)
*C08G 64/34* (2006.01)

(52) U.S. Cl.
CPC .......... *B01J 38/52* (2013.01); *B01J 31/2208* (2013.01); *B01J 31/4015* (2013.01); *C08G 64/34* (2013.01); *B01J 2531/26* (2013.01)

(58) Field of Classification Search
None
See application file for complete search history.

(56) References Cited

U.S. PATENT DOCUMENTS

| | | |
|---|---|---|
| 3,579,535 A | 5/1971 | Denss et al. |
| 3,665,010 A | 5/1972 | Denss et al. |
| 3,665,011 A | 5/1972 | Denss et al. |
| 3,673,212 A | 6/1972 | Denss et al. |
| 3,689,656 A | 9/1972 | Denss et al. |
| 4,960,862 A | 10/1990 | Carroll et al. |
| 2005/0222364 A1 | 10/2005 | Rawlins et al. |
| 2009/0240025 A1 | 9/2009 | Fujimoto et al. |
| 2014/0012026 A1 | 1/2014 | Choi et al. |
| 2015/0218310 A1 | 8/2015 | Kim et al. |
| 2016/0137807 A1 | 5/2016 | Kaiho et al. |
| 2016/0194442 A1 | 7/2016 | Kim et al. |
| 2016/0222159 A1 | 8/2016 | Kang et al. |
| 2016/0289379 A1 | 10/2016 | Kim et al. |
| 2018/0265632 A1 | 9/2018 | Kim et al. |
| 2019/0010283 A1 | 1/2019 | Lee et al. |
| 2020/0216612 A1 | 7/2020 | Kim et al. |

FOREIGN PATENT DOCUMENTS

| | | |
|---|---|---|
| CN | 101780419 A | 7/2010 |
| CN | 103492039 A | 1/2014 |
| CN | 104023848 A | 9/2014 |
| CN | 104327254 A | 2/2015 |
| CN | 104662065 A | 5/2015 |
| CN | 105339431 A | 2/2016 |
| CN | 108602063 A | 9/2018 |
| DE | 102004017005 A1 | 10/2005 |
| EP | 0393390 A2 | 10/1990 |
| GB | 1200204 A | 7/1970 |
| JP | H02-97525 A | 4/1990 |
| JP | H02-292328 A | 12/1990 |
| JP | 2571269 B2 | 1/1997 |
| JP | 3000064 B2 | 1/2000 |
| JP | 2016-530301 A | 9/2016 |
| JP | 6073148 B2 | 2/2017 |
| KR | 10-2009-0025219 A | 3/2009 |
| KR | 10-2014-0039628 A | 4/2014 |
| KR | 10-2015-0050461 A | 5/2015 |
| KR | 10-2015-0058044 A | 5/2015 |
| KR | 2015-0052779 A | 5/2015 |
| KR | 1020150052779 A | 5/2015 |
| KR | 10-2017-0006157 A | 1/2017 |
| KR | 10-2017-0110948 A | 10/2017 |
| KR | 10-2018-0060646 A | 6/2018 |

OTHER PUBLICATIONS

Kim. et al. "Hydrothermal Synthesis of Single-Crystalline Zinc Glutarate and Its Structural Determination" American Chemical Society, Chem. Mater. 2004, vol. 16. pp 2981-2983.
Zhong et al., "Solvent free synthesis of organometallic catalysts for the copolymerisation of carbon dioxide and propylene oxide", The University of Sydney, Applied Catalysis B. Environmental, Elsevier, 2010, vol. 98, No. 3-4, pp. 101-111, XP027134692.
Zhong, X. et al., "Solvent free synthesis of organometallic catalysts for the copolymerisation of carbon dioxide and propylene oxide", Applied Catalysis B. Environmental, Elsevier, 2010, vol. 98, No. 3-4, pp. 101-111, XP027134692.
Wu Gang et al., (2017) "Material Science and Engineering Practical Teaching Guide", Tongji University Press, pp. 98-101.

*Primary Examiner* — Yun Qian
(74) *Attorney, Agent, or Firm* — Bryan Cave Leighton Paisner LLP

(57) ABSTRACT

The present disclosure relates to a method for regenerating a waste organic zinc catalyst by performing surface modification using a dicarboxylic acid and a zinc compound. When using the method for regenerating an organic zinc catalyst according to the present disclosure, the organic zinc catalyst can be regenerated using a convenient method which modifies the dicarboxylic acid and the zinc compound in an alternately repeated manner.

12 Claims, No Drawings

METHOD FOR REGENERATING WASTE ORGANIC ZINC CATALYST THROUGH SURFACE MODIFICATION

CROSS-REFERENCE TO RELATED APPLICATIONS

This application is a National Phase entry pursuant to 35 U.S.C. § 371 of International Application No. PCT/KR2019/018250 filed on Dec. 20, 2019, and claims the benefit of and priority to Korean Patent Application No. 10-2018-0167325, filed on Dec. 21, 2018, in the Korean Intellectual Property Office, all of which are hereby incorporated by reference in their entirety for all purposes as if fully set forth herein.

TECHNICAL FIELD

The present invention relates to a method for regenerating a waste organic zinc catalyst by performing surface modification using a dicarboxylic acid and a zinc compound.

BACKGROUND ART

Plastics are used as raw materials for various articles due to easy manufacturing and use convenience thereof and are used in various fields not only for disposable articles such as packaging films, disposable cups and disposable dishes, but also for building materials and automobile interior materials. As the amount of plastics used increases, the amount of plastic waste increases, and since most plastics are not decomposed in the natural environment, the plastic waste is mainly treated by incineration. However, the incineration causes a problem of environmental pollution such as poisonous gas. Thus, biodegradable plastics that are decomposed naturally in natural environments have recently been developed.

Biodegradable plastics are plastics that are decomposed slowly in water due to their chemical structure, and in wet environments such as soil or seawater, the biodegradable plastics start to be decomposed within several weeks and disappear within one to several years. Further, the degradation products of biodegradable plastics are less harmful to the environment because they are decomposed into harmless components such as water or carbon dioxide.

In particular, recently, the polyalkylene carbonate resin obtained by polymerization of epoxide with carbon dioxide attracts much attention as a kind of biodegradable resin. Polyalkylene carbonate is an amorphous transparent resin, has only an aliphatic structure unlike aromatic polycarbonate which is similar-series engineering plastic, and is synthesized by a copolymerization reaction of carbon dioxide and epoxide as direct monomers (main raw materials) in the presence of a catalyst. Polyalkylene carbonate has excellent transparency, elongation, and oxygen blocking performance, exhibits a biodegradable property, and has a merit of being completely decomposed into carbon dioxide and water during combustion and not leaving carbon residues.

Various methods for producing the polyalkylene carbonate resins have been studied, and in particular, an organic zinc catalyst, such as a zinc glutarate catalyst, which is a catalyst for carbon dioxide plastic polymerization in coordination polymer series, and in which zinc and a dicarboxylic acid are bonded, have been widely known as a representative catalyst for the copolymerization reaction of epoxide with carbon dioxide.

The organic zinc catalyst plays an important role in the copolymerization reaction in that the productivity in the production of a polyalkylene carbonate resin is determined by the activity of the organic zinc catalyst. However, since a waste organic zinc catalyst once used in a copolymerization reaction of carbon dioxide and epoxide loses catalytic activity and cannot be reused, various attempts for achieving economic feasibility have been carried out by recovering and regenerating the catalyst after completing the polymerization reaction, and then adding the regenerated catalyst to the copolymerization reaction for reuse.

For example, a method have been disclosed in which a catalyst is regenerated by separating the organic zinc catalyst from a polycarbonate resin solution using a filter or centrifugation, and then retreating the catalyst with a solution including an excessive amount of dicarboxylic acid. However, this method has a limitation in that since the catalyst is basically regenerated in a solution or slurry, a separate washing process is additionally required, costs also increase, and thus economic feasibility can not be practically achieved through the regeneration of the catalyst.

PRIOR ART DOCUMENT

Patent Document (Patent document 1) KR 2009-0025219 A

DISCLOSURE OF THE INVENTION

Technical Problem

An aspect of the present invention provides a method for simply and economically regenerating a waste organic zinc catalyst by alternately dry-mixing a dicarboxylic acid and a zinc compound with the waste organic zinc catalyst and performing surface modification.

Technical Solution

According to an aspect of the present invention, there is provided a method for regenerating a waste organic zinc catalyst, the method including: (a) mixing and stirring a waste organic zinc catalyst with a dicarboxylic acid to generate a mixture; and (b) mixing and stirring the mixture with a zinc compound, wherein the dicarboxylic acid and the zinc compound are solid phases, respectively, and each of the steps (a) and (b) is alternately repeated at least twice.

Advantageous Effects

When using a regeneration method according to the present invention, the activity of a catalyst can be recovered by alternately and repeatedly dry-mixing a dicarboxylic acid and a zinc compound with the waste organic zinc catalyst, and thus, the waste organic zinc catalyst can be regenerated through a simple and efficient method.

In addition, the regeneration method according to the present invention has a merit in that since no separate solvent is used during catalyst regeneration using dry mixing, economic feasibility can be enhanced by reducing costs for a regeneration process and an additional solvent treatment process is not required.

In addition, in the regeneration method according to the present invention, the activity of the waste organic zinc catalyst is recovered to a high level, so that the waste organic zinc catalyst can easily be reused.

MODE FOR CARRYING OUT THE INVENTION

Hereinafter, the present invention will be described in more detail to help understanding the present invention.

It will be understood that words or terms used in the specification and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The present invention provides a method for regenerating a waste organic zinc catalyst, the method including: (a) mixing and stirring a waste organic zinc catalyst with a dicarboxylic acid to generate a mixture; and (b) mixing and stirring the mixture with a zinc compound, wherein the dicarboxylic acid and the zinc compound are solid phases, respectively, and each of steps (a) and (b) is alternately repeated at least twice.

The regeneration method of the present invention includes: (a) mixing and stirring a waste organic zinc catalyst with a dicarboxylic acid to generate a mixture; and (b) mixing the mixture with a zinc compound.

According to the X-ray single crystal structure of zinc glutarate, each zinc ion at the center is coordinately bonded to each of oxygen atoms derived from mutually different four carboxylic groups, and the distance between the zinc ions is 4.639 Å (Moonhor Ree et al., Chem. Mater. 2004, 16, 2981). According to the reported crystal structure, when considering the van der walls radius of the constituent atom, almost no vacant space is present inside the crystal, and thus, reactions occur only on the surface of a catalyst during polymerization using the organic zinc catalyst, and the zinc present on the surface of the catalyst acts as an active site of the catalyst and functions as a catalyst in a polymerization reaction of epoxide and carbon dioxide. For such a reason, the activity of the organic zinc catalyst greatly depends on the surface area of the catalyst.

That is, in terms of catalyst regeneration for achieving economic feasibility and reducing costs, it is efficient to allow a regeneration reaction to occur centering on the surface area of the recovered waste organic zinc catalyst in order to exhibit a maximum catalyst regeneration with a minimum cost.

According to an embodiment of the present invention, a waste organic zinc catalyst which has been recovered after being used is first mixed with a dicarboxylic acid to form a coordination bond between an zinc ion present on the surface of the catalyst and a carboxylic group, and then coordination bonds are continuously formed on the surface while alternately mixing a zinc compound and the dicarboxylic acid. Thus, a highly efficient regeneration effect can be obtained with a minimum cost.

The waste organic zinc catalyst means a catalyst which becomes difficult to obtain polyalkylene carbonate since having been used minimally once or twice or more as a catalyst for a polymerization of a monomer including epoxide and carbon dioxide, and since being incapable of exhibiting sufficient catalytic activity without any change.

The dicarboxylic acid and the zinc compound are solid phases and include all known solid phase forms, such as powder, crystals, and the like. That is, the mixing of the organic zinc catalyst, the dicarboxylic acid, and the zinc compound is performed in a dry blending manner.

When the organic zinc catalyst is reacted in a liquid phase or a slurry phase, not only the characteristics of the organic zinc catalyst may vary due to a solvent, but also an additional water treatment process and the like are indispensible. Thus, such a method results in the dicarboxylic acid and the zinc compound being reacted again in a solution. Consequently, the above method does not serve as catalyst regeneration but as production of a new catalyst, and the purpose of regenerating the organic zinc catalyst simply and economically cannot be achieved.

In addition, in the reaction in a liquid phase or a slurry phase, crushing, impacting, grinding, and the like are applied to the organic zinc catalyst by using mechanical energy, and thus, a change is caused not only on the surface of the catalyst but also inside the catalyst, and this phenomenon is referred to as mechanochemistry. In this case, there is a concern that the surface characteristics of the waste organic zinc catalyst are damaged due to physical shocks during a regeneration process.

According to an embodiment of the present invention, the waste organic zinc catalyst, the dicarboxylic acid, and the zinc compound are mixed in a dry manner to coat the surface of the organic zinc catalyst, and thus, the catalytic activity can be stably recovered by minimizing the costs and time consumed for the catalyst generation process and maximizing the regeneration efficiency.

For the dry mixing, known mixing methods and apparatuses capable of homogeneous mixing of the abovementioned materials may freely be used, and specifically, a stir mixer, a V-type mixer, a W-type mixer, a ribbon mixer, a drum mixer, a ball mill, or the like may be used, but not be limited thereto.

In the regeneration method of the present invention, each of steps (a) and (b) above may be alternately repeated at least twice, favorably at least three times, and more favorably 3 to 5 times.

In cases in which steps (a) and (b) are alternately and repeatedly performed as described above, the dicarboxylic acid and the zinc compound are alternately mixed with the organic zinc catalyst and are stirred. As described above, the dicarboxylic acid and the organic zinc catalyst are mixed and stirred, so that zinc ions present on the surface of the organic zinc catalyst and oxygen atoms derived from the carboxylic group of the dicarboxylic acid form coordination bonds, and subsequently, the coordination bonds may be continuously formed on the surface of the organic zinc catalyst through the alternately mixing and stirring the zinc compound and the dicarboxylic acid. Accordingly, the organic zinc catalyst recovers the catalytic activity.

Here, in step (a), the zinc ions on the waste organic zinc catalyst and the oxygen atoms derived from the dicarboxylic acid mixed in step (a) form coordination bonds, and in step (b), the oxygen atoms derived from the dicarboxylic acid mixed in step (a) and the zinc ions of the zinc compound mixed in step (b) form coordination bonds, and therefore the coordination bonds may be continuously formed on the surface of the waste organic zinc catalyst. Accordingly, in the present invention, the waste organic zinc catalyst is regenerated and the catalytic activity thereof is recovered.

In addition, the stirring time is configured to be capable of stirring for 3 to 20 minutes in terms of efficiency of catalyst regeneration and economical feasibility. In step (a), in order to form coordination bonds on the surface of the organic zinc catalyst, the organic zinc catalyst and the dicarboxylic acid should be mixed and stirred during a suitable time. At this point, when stirring is not performed in step (a) or (b) or the stirring time is too short, there may occur a problem in that sufficient coordination bonds are not formed between the organic zinc catalyst and the dicarboxylic acid, and when the stirring time is too long, there may occur a problem in that economic feasibility is degraded.

In addition, when the dicarboxylic acid and the zinc compound are not sequentially mixed while repeating mixing and stirring in steps (a) and (b) as described above, but are mixed at once with the waste organic zinc catalyst, only a new organic zinc catalyst is generated by the reaction of the dicarboxylic acid and the zinc compound and the degree of occurrence of reaction on the surface of the organic zinc catalyst is remarkably reduced, and thus, a problem may occur in that the purpose of the present invention to coat the surface of the waste organic zinc catalyst to regenerate the waste organic zinc catalyst and recover the catalytic activity is not properly achieved.

The dicarboxylic acid may include a C3-C20 aliphatic dicarboxylic acid, a C8-C40 aromatic dicarboxylic acid, or the like.

Specifically, the C3-C20 aliphatic dicarboxylic acid may be, but not limited to, for example, a malonic acid, a succinic acid, a glutaric acid, an adipic acid, a pimelic acid, or a mixture thereof, and the C8-C40 aromatic dicarboxylic acid may be, but not limited to, a terephthalic acid, an isophthalic acid, a homophthalic acid, a phenyl glutaric acid, or a mixture thereof.

Specifically, in terms of the activity of the organic zinc catalyst, the glutaric acid may favorably be used as the dicarboxylic acid, and in this case, the organic zinc catalyst is a zinc glutarate-based catalyst.

The zinc compound may be freely used without being limited by the type thereof, as long as the zinc compound is one of zinc precursors capable of producing an organic zinc catalyst by reacting with the dicarboxylic acid. Specifically, the zinc compound is a zinc precursor, and the type thereof may be one or more selected from the group consisting of zinc oxide (ZnO), zinc nitrate ($Zn(NO_3)_2$), zinc acetate ($Zn(CH_3CO_2)_2$), zinc hydroxide ($Zn(OH)_2$), zinc sulfate ($ZnSO_4$), and zinc chlorate ($Zn(ClO_3)_2$).

The content of the dicarboxylic acid in step (a) may be, with respect to 100 parts by weight of the waste organic zinc catalyst, 0.5 to 20 parts by weight, favorably 2 to 20 parts by weight, and more favorably 2 to 8 parts by weight. In addition, the content of the zinc compound in step (b) may be, with respect to 100 parts by weight of the waste organic zinc catalyst, 0.5 to 20 parts by weight, favorably 1 to 10 parts by weight, and more favorably 1 to 5 parts by weight.

When the content of the dicarboxylic acid or the zinc compound exceeds the above range, the amount of the dicarboxylic acid or the zinc compound is excessive compared to the surface of the waste organic zinc catalyst, so that the dicarboxylic acid and the zinc compound which fail to be bonded to the surface of the catalyst remain around the catalyst. In this case, a coordination bond on the waste organic zinc catalyst is interfered and a self bond is formed outside the catalyst, so that effects of the surface modification of the waste catalyst and the catalytic activity recovery may be interfered. In addition, when the content of the dicarboxylic acid or the zinc compound is less than the above range, the surface modification effect of the waste organic zinc catalyst is not sufficiently exhibited, and thus, the regeneration process of the organic zinc catalyst may not be smoothly performed.

In addition, the mole ratio of the dicarboxylic acid to the zinc compound may be 1:0.5 to 1:1.5, specifically be 1:0.7 to 1:1.5 or 1:0.9 to 1:1.1, and more favorably be 1:1. When the mole ratio exceeds the above ranges, the effect of surface modification of the organic zinc catalyst and the regeneration effect due to the surface modification may be degraded, and thus, the dicarboxylic acid and the zinc compound should be used at a suitable relative ratio so as to exhibit maximum coordination bond on the surface of the organic zinc catalyst.

The catalyst regenerated by the abovementioned method may have catalytic activity of 50% or more, favorably 80% or more, more favorably 90% or more of the catalytic activity of the catalyst before the regeneration, that is, the waste organic zinc catalyst.

According to an embodiment of the present invention, when a waste organic zinc catalyst is regenerated using the abovementioned regeneration method, the catalytic activity is recovered up to 90% or more of the catalytic activity before the regeneration, and thus, the catalytic activity of the waste organic zinc catalyst can be remarkably recovered and the waste organic zinc catalyst can be easily reused.

In addition, the present invention provides a method for producing a polyalkylene carbonate resin, the method including polymerizing monomers including epoxide and carbon dioxide in the presence of an organic zinc catalyst regenerated by the abovementioned method.

In the polymerizing of monomers including epoxide and carbon dioxide, the regenerated organic zinc catalyst may be used in a form of a heterogeneous catalyst. As described above, the organic zinc catalyst has an activity of 50% or more of the catalytic activity before being regenerated, and thus may usefully be used as a catalyst for a copolymerization reaction of the monomers including carbon dioxide and epoxide.

The polymerizing may be performed as liquid phase polymerization in a solvent. As the solvent used in the liquid phase polymerization, methylene chloride, ethylene dichloride, trichloroethane, tetrachloroethane, chloroform, acetonitrile, propionitrile, dimethylformamide, N-methyl-2-pyrrolydone, dimethylsulfoxide, nitromethane, 1,4-dioxine, hexane, toluene, tetrahydrofuran, methylethyl ketone, methylamine ketone, methylisobutyl ketone, acetone, cyclohexanone, trichloroethylene, methyl acetate, vinyl acetate, ethyl acetate, propyl acetate, butylolactone, caprolactone, nitropropane, benzene, styrene, xylene, methyl propasol, or a mixture of two or more thereof may be used, and favorably dichloromethane or dichloroethane is used as a solvent, so that polymerization may be more effectively performed, but the present invention is not limited to these embodiments.

The epoxide compound may be, but not limited to, one or more selected from the group consisting of C2-C20 alkylene oxide substituted or unsubstituted with halogen or C1-C5 alkyl group, C4-C20 cycloalkylene oxide substituted or unsubstituted with halogen or C1-C5 alkyl group, and C8-C20 styrene oxide substituted or unsubstituted with halogen or C1-C5 alkyl group.

Specific examples of the C2-C20 alkylene oxide substituted or unsubstituted with halogen or C1-C5 alkyl group include, but is not limited to, ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxy-7-octane, epifluorohydrin, epichlorohydrin, epibromohydrin, isopropyl glycidyl ether, butyl glycidyl ether, t-butyl glycidyl ether, 2-ethylhexyl glycidyl ether, allyl glycidyl ether, or the like.

Specific examples of the C4-C20 cycloalkylene oxide substituted or unsubstituted with halogen or C1-C5 alkyl group include, but are not limited to, cyclopentene oxide, cyclohexene oxide, cyclooctene oxide, cyclododecene oxide, alpha-pinene oxide, 2,3-epoxynorbornene, limonene oxide, dieldrin, or the like.

Specific examples of the C8-C20 styrene oxide substituted or unsubstituted with halogen or C1-C5 alkyl group include, but are not limited to, 2,3-epoxypropylbenzene, styrene oxide, phenylpropylene oxide, stilbene oxide, chlorostilbene oxide, dichlorostilbene oxide, 1,2-epoxy-3-penoxypropane, benzyloxymethyl oxirane, glycidyl-methylphenyl ether, chlorophenyl-2,3-epoxypropyl ether, epoxypropyl methoxyphenyl ether, biphenyl glycidyl ether, glycidylnaphthyl ether, or the like.

Besides, the method and process conditions for polymerizing carbon dioxide and monomers including epoxide compound may use, without limitation, general polymerization conditions for producing polyalkylene carbonate resins.

EXAMPLES

Hereinafter, the present invention will be described in more detail using examples. However, the following examples are merely for illustrating the present invention, and the scope of the present invention is not limited to the examples.

Use and Recovery of Organic Zinc Catalyst

1) Production of Organic Zinc Catalyst

In a 500 ml circular bottom flask, 13.2 g (0.1 mol) of a glutaric acid, 8.2 g (0.1 mol) of zinc oxide (ZnO), and 0.2 mL of an acetic acid were added to 300 mL of toluene and dispersed under reflux. Subsequently, the solution mixture was heated at 55° C. for three hours and at 110° C. for four hours. White solids were generated and filtered, washed with acetone/ethanol, and then dried overnight at 130° C. with a vacuum oven.

2) Production of Polyalkylene Carbonate Resin

In a glove box, 16 g of a catalyst and 340.8 g of dichloromethane (methylene chloride) were put into a high-pressure reactor, and then 356 g of ethylene oxide was added. Subsequently, the inside of the reactor was pressurized to 30 bar using carbon dioxide. A polymerization reaction was performed at 70° C. for three hours. After completing the reaction, non-reacted carbon dioxide, ethylene oxide, and dichloromethane which is a solvent, were removed together. The remaining solids are completely dried and then quantified, and the amount of finally obtained polyethylene carbonate was measured.

3) Separation of Waste Organic Zinc Catalyst

In order to recover a waste organic zinc catalyst, a dried polyethylene carbonate was re-melted in a dichloromethane solvent. Waste organic zinc catalyst particles were recovered from the polyethylene carbonate solution using a centrifuge, and then the catalyst were washed using the dichloromethane solvent and dried.

Regeneration of Waste Organic Zinc Catalyst

Example 1

(Step i)

A magnetic bar and 10 g of the recovered organic zinc catalyst were put into a 250 mL circular bottom flask. Subsequently, 0.5 g (3.8 mmol) of a glutaric acid was added while stirring the resulting mixture at 600 rpm at room temperature, and then stirring was performed for 10 minutes. Next, 0.3 g (3.8 mmol) of zinc oxide was added and then stirring was performed for 10 minutes. The glutaric acid and the zinc oxide were added and stirred three times, respectively, by further performing the adding and stirring processes twice, respectively. The catalyst surface-treated through the abovementioned method was dried overnight at 70° C. with a vacuum oven.

(Step ii)

0.4 g of a surface-treated organic zinc catalyst and 8.52 g of dichloromethane were put into a glove box, and 8.9 g of ethylene oxide was added. Subsequently, the inside of the reactor was pressurized to 30 bar using carbon dioxide. A polymerization reaction was performed at 70° C. for three hours. After completing the reaction, non-reacted carbon dioxide, ethylene oxide, and dichloromethane which is a solvent, were removed together. The remaining solids were completely dried and then quantified, and the amount of finally obtained polyethylene carbonate was measured.

Example 2

An experiment was performed in the same manner as that in example 1 except for changing the amount of glutaric acid into 0.1 g (0.8 mmol) and changing the amount of zinc oxide into 0.07 g (0.8 mmol).

Example 3

An experiment was performed in the same manner as that in example 1 except for changing the amount of glutaric acid into 1 g (8 mmol) and changing the amount of zinc oxide into 0.7 g (8 mmol).

Example 4

An experiment was performed in the same manner as that in example 1 except for performing stirring for one minute when the zinc oxide was added to the organic zinc catalyst in step (i).

Example 5

An experiment was performed in the same manner as that in example 1 except for performing stirring for one minute when the glutaric acid was added to the organic zinc catalyst in step (i).

Comparative Example 1

An experiment was performed in the same manner as that in example 1 except for not undergone a regeneration process after recovering a catalyst.

Comparative Example 2

An experiment was performed in the same manner as that in example 1 except for performing reaction while performing shaking in a 50 mL reactor filled with 2 mm diameter zirconia balls instead of simple stirring.

Comparative Example 3

An experiment was performed in the same manner as that in example 1 except for adding at once 1.5 g (11.4 mmol) of glutaric acid and 0.9 g (11.4 mmol) of zinc oxide to an organic zinc catalyst and performing simple mixing in step (i).

Comparative Example 4

An experiment was performed in the same manner as that in example 1 except for performing simple mixing without performing stirring for 10 minutes when the zinc oxide was added to the organic zinc catalyst in step (i).

Comparative Example 5

An experiment was performed in the same manner as that in example 1 except for performing simple mixing without performing stirring for 10 minutes when the glutaric acid was added to the organic zinc catalyst in step (i).

Comparative Example 6

An experiment was performed in the same manner as that in example 1 except for mixing an organic zinc catalyst with 30 g of dicarboxylic acid under the presence of toluene as a solvent.

Comparative Example 7

An experiment was performed in the same manner as that in example 1 except for performing each of adding and stirring processes only once.

Comparative Example 8

An experiment was performed in the same manner as that in example 1 except for using 0.5 g (3.8 mmol) of glutaric acid and 0.15 g (1.9 mmol) of zinc oxide.

Use of Regenerated Organic Zinc Catalyst

Polyalkylene carbonate resins were produced in the same manner as described above using the organic zinc catalysts obtained from examples 1 to 5 and comparative examples 1 to 8. The activities and yields of the catalysts according to the results of the above polymerization are shown in Table 1 below.

TABLE 1

|  | Polyalkylene carbonate resin content (g) | Catalytic activity (g-polymer/g-catalyst) |
|---|---|---|
| Control group | 15.3 | 38.3 |
| Example 1 | 13.8 | 34.5 |
| Example 2 | 10.1 | 25.3 |
| Example 3 | 12.3 | 30.8 |
| Example 4 | 9.1 | 22.8 |
| Example 5 | 8.0 | 20.0 |
| Comparative example 1 | 6.5 | 16.3 |
| Comparative example 2 | 0.1 | 0.3 |
| Comparative example 3 | 5.3 | 13.3 |
| Comparative example 4 | 3.7 | 9.3 |
| Comparative example 5 | 2.9 | 7.3 |
| Comparative example 6 | 7.6 | 19.0 |
| Comparative example 7 | 5.7 | 14.3 |
| Comparative example 8 | 1.7 | 3.5 |

As seen from Table 1, when an organic zinc catalyst was surface-modified through the regeneration method according to the present invention, a catalytic activity of the same level as the initial catalytic activity (control group) which was not regenerated was exhibited. On the other hand, it could be seen that in comparative example 1 in which a surface modification treatment was omitted, and in com- parative example 2 in which organic zinc catalyst particles were regenerated while grinding the particles with zirconia balls while performing shaking, the activity of the recovered organic zinc catalyst was remarkably degraded compared to those of the control group, and the yield of a polyalkylene carbonate resin was very low.

In addition, it was confirmed that in comparative example 3, glutaric acid and zinc oxide were not mixed with a temporal gap therebetween, but added at once and mixed, and consequently, the degree of regeneration of the catalytic activity of a waste organic zinc catalyst was degraded compared to those of examples, and also in comparative example 4, catalyst regeneration was not effectively per- formed because a stirring process was omitted.

Meanwhile, in comparative example 5, since performing simple mixing without stirring, coordination bonds were not sufficiently formed, and thus, the catalytic activity was also exhibited to be very low. In comparative example 6, the waste organic zinc catalyst was regenerated by mixing with an excessive amount of dicarboxylic acid in the presence of a solvent as in related arts, and it was confirmed that the regeneration capability of the catalytic activity was degraded compared to that in the regeneration method according to the present invention, and when a dicarboxylic acid and a zinc compound were mixed only once as in comparative example 7, and also when an experiment was performed while setting the mole ratio 2:1 of the dicarboxylic acid and the zinc compound as in comparative example 8, it could be seen that the recovery of the catalytic activity was also degraded. Meanwhile, comparing examples 1 to 3, it was found that example 1 exhibited the most excellent catalytic activity, and in example 2, in which the contents of dicarboxylic acid and zinc oxide were smaller, and in example 3 in which the contents of dicarboxylic acid and zinc oxide were greater, the catalytic activity was lower than that in example 1.

That is, it was confirmed that the dicarboxylic acid and the zinc compound were mixed in suitable contents considering the surface area of an organic zinc catalyst and coordination bonds were effectively induced in the catalyst surface area, whereby the regeneration effect of catalysts could be maxi- mally exhibited.

The invention claimed is:

1. A method for regenerating a waste organic zinc catalyst, the method comprising: (a) mixing and stirring a waste organic zinc catalyst with a dicarboxylic acid to generate a mixture; and
   (b) mixing and stirring the mixture with a zinc compound, wherein the dicarboxylic acid and the zinc compound are solid phases, respectively,
   wherein each of the steps (a) and (b) is alternately repeated at least twice, and
   wherein each of the steps (a) and (b) is performed in a dry blending manner without using any solvent until a regeneration reaction is completed.

2. The method of claim 1, wherein in each of the steps (a) and (b), the stirring is independently performed for 3 to 20 minutes.

3. The method of claim 1, wherein the steps (a) and (b) are alternately repeated 3 to 5 times.

4. The method of claim 1, wherein in the step (a), zinc ions on a surface of the waste organic zinc catalyst form coordination bonds with oxygen atoms from the dicarbox- ylic acid mixed in the step (a).

5. The method of claim 1, wherein in the step (b), oxygen atoms from the dicarboxylic acid mixed in step (a) form coordination bonds with zinc ions of the zinc compound mixed in step (b).

6. The method of claim 1, wherein the dicarboxylic acid is one or more selected from the group consisting of malonic acid, succinic acid, glutaric acid, adipic acid, pimelic acid, terephthalic acid, isophthalic acid, homophthalic acid, and phenyl glutaric acid.

7. The method of claim 1, wherein the zinc compound is a zinc precursor and is one or more selected from the group consisting of zinc oxide (ZnO), zinc nitrate ($Zn(NO_3)_2$), zinc acetate ($Zn(CH_3CO_2)_2$), zinc hydroxide ($Zn(OH)_2$), zinc sulfate ($ZnSO_4$), and zinc chlorate ($Zn(ClO_3)_2$).

8. The method of claim 1, wherein a content of the dicarboxylic acid in the step (a) is 0.5 to 20 parts by weight based on 100 parts by weight of the waste organic zinc catalyst.

9. The method of claim 1, wherein a content of the zinc compound in the step (b) is 0.5 to 20 parts by weight based on 100 parts by weight of the waste organic zinc catalyst.

10. The method of claim 1, wherein a mole ratio of the dicarboxylic acid and the zinc compound is 1:0.5 to 1:1.5.

11. The method of claim 1, wherein each of the steps (a) and (b) is independently performed using a stir mixer, a V-type mixer, a W-type mixer, a ribbon mixer, a drum mixer, or a ball mill.

12. The method of claim 1, wherein a catalyst regenerated by the method has a catalytic activity of at least 50% of a catalytic activity before being regenerated.

\* \* \* \* \*